United States Patent [19]

Snyder et al.

[11] 3,875,763

[45] Apr. 8, 1975

[54] METHOD OF STRENGTHENING GLASS CONTAINERS

[75] Inventors: Herbert C. Snyder, Brockway; Louis V. Mancuso, Reynoldsville, both of Pa.

[73] Assignee: Brockway Glass Company Inc., Brockway, Pa.

[22] Filed: Mar. 12, 1973

[21] Appl. No.: 340,286

[52] U.S. Cl. ............... 65/30; 65/60; 117/124 E
[51] Int. Cl. ................. C03c 21/00; C03c 17/00
[58] Field of Search ............. 65/30, 60, 23; 117/94, 117/124 E, 124 D, 21

[56] References Cited

UNITED STATES PATENTS

| | | | |
|---|---|---|---|
| 3,253,975 | 5/1966 | Olcott et al. | 65/30 X |
| 3,305,812 | 2/1967 | Macchia et al. | 117/21 X |
| 3,464,807 | 9/1969 | Pressau | 65/60 X |
| 3,475,150 | 10/1969 | Bishop et al. | 65/60 |
| 3,713,867 | 1/1973 | Parkinson et al. | 65/60 X |
| 3,743,491 | 7/1973 | Poole et al. | 65/30 |

FOREIGN PATENTS OR APPLICATIONS

| | | | |
|---|---|---|---|
| 220,363 | 6/1957 | Australia | 117/DIG. 6 |

OTHER PUBLICATIONS

Golding, Polymers and Resins, 7/1962, D. Van Nostrand Co. Inc., Patent Office Library, (Gr. 160) TP156 P666 C.7, pages 207–209.

Uses and Applications of Chemicals and Related Materials, Gregory Reinhold Pub. Corp., Pat. Office Lib., (Gr. 160) TP9, G79 C.S. 1944, p. 160, same as "S," Vol. II, page 74.

*Primary Examiner*—S. Leon Bashore
*Assistant Examiner*—Kenneth M. Schor
*Attorney, Agent, or Firm*—Christel & Bean

[57] ABSTRACT

A glass container is provided with a compressive stress layer at its exterior surface by the replacement of sodium ions in the glass surface with potassium ions of larger atomic diameter and the container is then provided with a plastic enveloping sheath of a thickness of 0.003 inch up to about 0.010 to provide a shock resistant, shard-retaining envelope for the container where said sheath is applied while said container is at temperature of approximately 300°F to 600°F.

5 Claims, No Drawings

METHOD OF STRENGTHENING GLASS CONTAINERS

BACKGROUND OF THE INVENTION

This invention relates to glass containers and particularly to a method of producing glass containers of greatly increased effective strength and shock resistance by a combination of ion exchange treatment of the outer surface of the container to provide a compressive stress layer and a subsequent jacketing of the container with a synthetic resin coating of such thickness as to form an enveloping shock resistant sheath.

Ion exchange strengthening of glass surfaces to strengthen the same by producing a compression layer at the glass surface is known in the art. For instance, Poole et al. U.S. Pat. No. 3,607,172 dated Sept. 21, 1971, discloses a method of producing such a compressive layer in soda lime glass by spraying hot glass containers with a water solution of a potassium salt to substitute potassium ions for sodium ions at the glass surface, the potassium ions having a larger atomic diameter than the sodium ions.

Also, application of a synthetic resin coating to glass bottles is known in the art. Representative patents showing such coatings are Smith et al. U.S. Pat. No. 3,362,843, dated Jan. 9, 1968 and Clock U.S. Pat. No. 3,415,673, dated Dec. 10, 1968. In the latter patent glass containers are dipped in polyethylene solutions to provide an adherent substrate and are then provided with a coating of ethylene-acrylic acid copolymer to a thickness of about 0.010 inch by spraying the coating material on the glass article with an electrostatic powder spray gun, then heating the article to fuse the powder to the glass article.

In a copending application of Poole et al., Ser. No. 161,982, filed July 12, 1971, now U.S. Pat. No. 3,743,491, dated July 3, 1973, there is disclosed a method of strengthening glass articles by ion exchange treatment and also rendering the articles abrasion-resistant by applying polyethylene or similar synthetic resin materials to the glass surface after first treating the latter with metal oxides such as tin oxide or various titanates to provide a surface to which the final polyethylene coating will adhere. In this method the polyethylene coating is relatively thin and contributes nothing to the strength or shock resistance of the container, being provided solely to make the container surface lubricious and thus render the same resistant to abrasion.

The treatment of glass containers to render them abrasion resistant by applying a metal oxide coating to the glass container while the same is in a heated condition and then treating the same with a polyethylene or other polymer coating after the glass has cooled to approximately 200° F. is widely practiced and well known. However, the so-called "cold end" coating or polyethylene or other polymer is not in any sense comparable to the resin of the present invention. In conventional abrasion resistant treatment the final polyethylene coating is molecular in thickness and is physically unmeasurable, being of the order of a small fraction of a micron. This coating is applied merely to give the article surface lubricity and does not in any sense form a physical film or envelope of any strength characteristics whatever.

SUMMARY OF THE INVENTION

In practising the method of the present invention the glass surface is first subjected to ion exchange treatment to produce a compressive surface layer by substituting ions of larger atomic diameter for ions of smaller atomic diameter. This may be effected as fully described in the aforementioned U.S. Pat. No. 3,607,172 wherein a water solution of tripotassium phosphate is sprayed on the hot glass surface at a temperature at or slightly below the strain point of the glass so that the solution pyrolyzes to deposit the potassium salt on the glass surface. The glass is then cooled gradually so that its temperature remains sufficiently high for a period of time which is long enough to permit effective ion exchange.

Other potassium salts may be employed, for instance, dipotassium hydrogen phosphate or potassium carbonate, although tripotassium phosphate is believed to be of superior effectiveness.

Subsequent to the ion exchange strengthening step a layer of plastic material is applied of sufficient thickness to form a protective plastic envelope about the article, such envelope having a minimum thickness of approximately 0.003 inch and preferably from 0.004 inch to 0.010 inch. The only upper limitation on thickness of the plastic sheath is one of economy of material and cost of application.

Glass containers being treated in accordance with the method of the present invention do not require the abrasion resistance treatment described above and disclosed in patent application, Ser. No. 161,982 unless there is a substantial delay between the ion exchange strengthening step and the final provision of the plastic sheath, in which case the abrasion resistance treatment will prevent scratching of the strengthened glass surface prior to the final plastic sheath application.

Since the glass is subjected to the potassium salt solution spray at a temperature in the general range of 1,000° F. and is then gradually cooled to a temperature of approximately 200° F., and since the plastic application in preferred embodiments described later herein requires the glass to be at a temperature of approximately 600° F., it is desirable to effect the plastic coating treatment by interruption of the cooling process which occurs during passaage of the articles through the usual annealing lehr, such interruption occurring when the glass reaches the proper temperature for plastic application.

EMBODIMENTS OF THE INVENTION

In practising the present invention bottles are sprayed with a water solution of tripotassium phosphate while the bottles are at or slightly below 1,000° F., the approximate strain point of soda lime glass of the constituency commonly used in beverage bottles, for instance. The bottles may be thus treated shortly after they leave the bottle forming machines at a point when they are at the above approximate temperature. The bottles may be sprayed at lower temperatures but are then preferably raised in temperature to approximately 1,000° F. and held at such temperature for about five minutes and then cooled in about fifteen minutes. This "soaking" period is required to effect the proper degree of substitution of potassium ions for sodium ions in the glass surface. All of the foregoing is set forth more fully in the above cited Poole et al. U.S. Pat. No. 3,607,172, the disclosure of which may be considered to be included herein by reference.

Other methods which exchange larger ions for smaller ions in the glass surface may also be employed to produce the desired compressive layer in the glass surface by chemical means. Dipotassium hydrogen phosphate and potassium carbonate are other potassium salts which may be employed although strengthening is believed to be achieved to the fullest extent by the employment of the aforesaid tripotassium phosphate. Following the "soaking" period the bottles are washed to remove excess salt from the glass surface.

Following the foregoing ion exchange strengthening of the glass article the plastic jacket or sheath is applied. By way of example, powdered plastic materials which may be employed are so-called ionomers which are ionic polymers, the term being generally applied to that class of polymers in which ionized carboxyl groups create ionic cross links in the intermolecular structure. A representative ionomer resin is one manufactured by E. I. DuPont de Nemours & Co. Inc. under the tradename "Surlyn-AD 5001."

This resin, ground to 100 mesh or finer, can readily be applied by the use of an electrostatic spray gun and in such application the bottles are heated or held at a surface temperature of approximately 600° F. The spray guns are operated with a controlled standard air pressure, a controlled cascade pressure, and a constant particle charge having a potential of 70,000 volts (70Kv.). In the tests and demonstrations made in demonstrating the effectiveness of the present invention the spray gun tip was maintained at a distance of 12 inches from the bottle surface, the bottles being rotated on their vertical axes and electrostatic spraying was effected for various time periods from 2 seconds to 7 seconds. The bottles were then permitted to cool to room temperature.

Another representative plastic material which has been employed in tests and demonstrations of the present invention is cellulose acetate butyrate of 150 mesh particle size. This material may be purchased from Eastman Chemical Products, Inc. by whom it is identified as Tenite CAB Powder Formula 7400–W. This material may be applied with the same electrostatic spray gun technique described in the previous example and with the bottles at approximately the same temperature.

It has been found that plastic sheaths having a thickness of from 0.004 inch to 0.010 inch give good results although a sheath thickness as low as 0.003 inch may be employed with satisfactory result.

The foregoing two resin compositions and others may be applied by employing fluidized bed techniques in place of the electrostatic spray gun of the foregoing examples. In fluidized bed application the powdered plastic material is maintained in a fluidized condition by an ascending column of dry air and the heated article is exposed to the fluidized powdered plastic material for several seconds or until the desired thickness of coating is achieved. The plastic particles coming into contact with the heated surface of the glass bottle or other article fuse to form a smooth continuous coating after being removed from the bed.

A full description of fluidized bed coating techniques will be found in "Technical Proceedings of the Forty-Ninth Annual Convention, American Electroplaters Society, June 24–28, 1962," beginning at page 99 thereof. As there shown, the temperature of the article to be coated varies somewhat with various plastic powders. With polyethylene the required temperature of the article is from 300° to 500° F., with cellulose acetate butyrate from 500° – 600° F. The required temperature for applying other common thermoplastic resins is given at page 102 of the aforesaid article.

The best results are substantially the same with either of the foregoing plastic coatings and whether the same be applied by electrostatic spray gun application, or by means of a fluidized bed. It is likewise immaterial from a breaking strength standpoint whether the bottles, in addition to the ion exchange strengthening, are treated for abrasion resistance in accordance with the aforesaid patent application, Ser. No. 161,982 or not.

The following are average test results of a large number of 12-oz. lightweight beer bottles dropped to land on their bottoms:

With untreated bottles or bottles having the standard tin oxide hot end treatment and polyethylene cold end treatment, filled and capped, bottles broke at an average drop height of 2 feet 5 inches.

Encapsulation of the above bottles, whether otherwise untreated or whether they have the above abrasion resistance treatment, increased the drop height at which breakage occurred to 3 feet, the thickness of the plastic sheath or encapsulation being 0.004 inch.

Bottles, either plain or having abrasion resistance treatment, when subjected to the foregoing tripotassium phosphate ion exchange strengthening, broke at an average drop height of 4 feet 4 inches.

The same ion exchange strengthened bottles with a subsequent encapsulating plastic sheath of a thickness of 0.004 inch broke at an average drop height of 5 feet 8 inches.

In addition to the increase in effective strength and shock resistance of the foregoing treatment, the plastic sheath or envelope renders the containers safer in handling and transportation since the plastic sheath retains the bottle contents and bottle fragments or shards in instances where the glass containers become broken.

As stated above, the foregoing treatments were applied to a large number of 12-oz. Lightweight amber beer bottles. The term "lightweight" is used here to describe conventional non-returnable bottles which are lighter in weight than conventional multiple trip bottles. However, the improvement in breaking strength produced by the combination of ion exchange strengthening and plastic encapsulation of the present invention is of such degree that beverage bottles and similar glass containers may be further materially lightened in weight by manufacturing them with thinner walls than has heretofore been practicable. The saving thus effected in material cost offsets to a substantial degree the cost of the plastic employed in encapsulating the containers.

The increase in strength of bottles treated in accordance with the present invention as reflected in the increased drop height at which the average bottle drops as set forth above is highly beneficial but does not tell the full story of the importance of the combined ion exchange strengthening and plastic encapsulation which are inherent in the present invention. Bottles which have been strengthened by ion exchange treatment which provides a compressive stress layer at the surface of the bottle may initially resist breakage when dropped from a given height but are very likely to become chipped and such chipping removes the compressive stress layer at the chipped area so that subsequent dropping from much lesser heights would result in breakage.

In addition to the advantages discussed earlier herein the plastic encapsulation prevents this type of surface chipping of the bottle and thus preserves the compressive stress layer and consequently the initial strengthening resulting from the above ion exchange treatment. Thus the practical strength increase and resistance to breakage of the bottles are very much greater than is indicated by the above test figures.

A further advantage in treating glass containers according to the present invention, which has been briefly alluded to above, resides in the fact that when encapsulated bottles do break, despite the ion exchange strengthening which forms part of the present invention, the glass fragments or shards are retained within the plastic capsule and generally speaking the contents of broken bottles are likewise retained within the encapsulating sheath.

Preferred embodiments of the present invention have been described herein to illustrate the underlying principles of the invention but it is to be understood that numerous modifications may be made without departing from the broad spirit and scope of the invention.

We claim:

1. The method of producing a strengthened soda-lime glass container comprising replacing alkali-metal ions in an exterior surface thereof with larger alkali-metal ions with the glass at an elevated temperature below the strain point thereof to produce a compression layer of glass at such surface, and subsequently forming on said surface a synthetic resin coating of a thickness of at least 0.003 inch up to about 0.010 inch to provide a protective, shock-resisting, shard-retaining encapsulating sheath for said container, said synthetic resin coating being applied with said container at an elevated temperature between approximately 300° and 600°F.

2. The method of claim 1 wherein said coating is formed by maintaining the container at an elevated temperature of approximately 600° F. and spraying powdered thermoplastic synthetic resin particles upon said glass container surface by means of an electrostatic spray gun.

3. The method of claim 1 wherein said coating is formed by maintaining the container at an elevated temperature of approximately 600° F. and passing the same through a fluidized bed of synthetic resin in powdered form.

4. The method according to claim 1 wherein the synthetic resin comprises an ionomer resin.

5. The method according to claim 1 wherein the synthetic resin comprises cellulose acetate butyrate.

* * * * *